US 11,256,821 B2

(12) United States Patent
Avidan et al.

(10) Patent No.: US 11,256,821 B2
(45) Date of Patent: Feb. 22, 2022

(54) METHOD OF IDENTIFYING AND TRACKING SENSITIVE DATA AND SYSTEM THEREOF

(71) Applicant: MINEREYE LTD., Hod Hasharon (IL)

(72) Inventors: Yaniv Avidan, Moshav Mahseya (IL); Avner Atias, KfarYona (IL)

(73) Assignee: MINEREYE LTD., Hod Hasharon (IL)

( * ) Notice: Subject to any disclaimer, the term of this patent is extended or adjusted under 35 U.S.C. 154(b) by 194 days.

(21) Appl. No.: 15/767,752

(22) PCT Filed: Oct. 10, 2016

(86) PCT No.: PCT/IL2016/051102
§ 371 (c)(1),
(2) Date: Apr. 12, 2018

(87) PCT Pub. No.: WO2017/064705
PCT Pub. Date: Apr. 20, 2017

(65) Prior Publication Data
US 2018/0300494 A1    Oct. 18, 2018

Related U.S. Application Data

(60) Provisional application No. 62/259,749, filed on Nov. 25, 2015, provisional application No. 62/241,298, filed on Oct. 14, 2015.

(51) Int. Cl.
*H04L 29/00* (2006.01)
*G06F 21/62* (2013.01)
(Continued)

(52) U.S. Cl.
CPC ...... *G06F 21/6218* (2013.01); *G06F 16/1734* (2019.01); *G06K 9/6217* (2013.01); *G06K 9/6284* (2013.01)

(58) Field of Classification Search
CPC ............ G06F 21/6218; G06F 16/1734; G06K 9/6217
(Continued)

(56) References Cited

U.S. PATENT DOCUMENTS 6,289,354 B1 *  9/2001  Aggarwal ........... G06F 16/2246
7,251,637 B1    7/2007  Caid et al.
(Continued)

FOREIGN PATENT DOCUMENTS

WO    2011/070832 A1    6/2011

OTHER PUBLICATIONS

Semi-supervised learning—Wikipedia, Jun. 18, 2015, XP055328084, Retrieved from the Internet: URL:http://en.wikipedia.org/w/index.php?title=Semi-supervised_learning&oldid=667482117 [retrieved on Dec. 12, 2016].

*Primary Examiner* — Jeffrey C Pwu
*Assistant Examiner* — Michael D Anderson
(74) *Attorney, Agent, or Firm* — Browdy and Neimark, PLLC

(57) ABSTRACT

Methods and systems for identifying sensitive data (SD) stored on data repositories is disclosed. The data is processed to calculate a plurality of float feature (FF) vectors associated with the data. The FF vectors are clustered into a plurality of clusters, each cluster associated with a respective subset of the data. A DNA vector representative of the cluster is generated for each cluster. The DNA vectors of respective clusters are compared to one or more FF vectors calculated for a respective one or more user supplied examples of SD. One or more clusters are classified as SD based on the result of the comparing, thereby identifying respective subsets of data as SD.

20 Claims, 5 Drawing Sheets

(51) Int. Cl.
*G06F 16/17* (2019.01)
*G06K 9/62* (2022.01)

(58) Field of Classification Search
USPC .......................................................... 713/165
See application file for complete search history.

(56) References Cited

U.S. PATENT DOCUMENTS

| | | | |
|---|---|---|---|
| 7,797,265 B2* | 9/2010 | Brinker | G06F 16/353 |
| | | | 706/45 |
| 8,181,260 B2 | 5/2012 | Friedman et al. | |
| 8,270,733 B2 | 9/2012 | Cobb et al. | |
| 9,237,170 B2 | 1/2016 | Kiangn et al. | |
| 9,268,947 B1 | 2/2016 | Jarlstrom et al. | |
| 9,792,289 B2* | 10/2017 | Reininger | G06F 16/156 |
| 2005/0138419 A1* | 6/2005 | Gupta | G06F 21/6218 |
| | | | 726/4 |
| 2009/0192979 A1 | 7/2009 | Lunde | |
| 2016/0117495 A1 | 4/2016 | Li et al. | |
| 2016/0132521 A1 | 5/2016 | Reininger et al. | |

* cited by examiner

METHOD OF IDENTIFYING AND TRACKING SENSITIVE DATA AND SYSTEM THEREOF

CROSS-REFERENCES TO RELATED APPLICATIONS

The present application claims benefit from U.S. Provisional Patent Application No. 62/241,298, filed on Oct. 14, 2015, and U.S. Provisional Patent Application No. 62/259,749 filed on Nov. 25, 2015, both applications incorporated herein by reference in their entirety.

TECHNICAL FIELD

The presently disclosed subject matter relates to sensitive data and, more particularly, to identifying sensitive data amongst data stored on data repositories.

BACKGROUND

In the last four years organizations have been experiencing a massive increase in the number of computers, network endpoints, and smart devices that connect to the organizational network. The increase in the volume of the data and the variety of data formats, combined with the development in the sophistication of the methods in which data is being stolen from within the organization have started to become a substantial challenge for companies and their CISO's, Fraud Managers and Risk Managers. To combat this challenge, companies often employ Data Protection (DP) systems to identify and control access to sensitive data (SD).

Current DP systems on the market today can be divided two types. The first type of DP system uses classification techniques to scan file contents for particular strings, keywords or data structures which are then used to classify the files as containing SD or not. However, in most cases the classification technologies are rather primitive and rely primarily on rule engines in order to find and protect SD. Thus, the responsibility lies with the analyst to be able to define a robust enough set of rules for identifying SD.

More advanced DP systems use statistical fingerprinting technologies to generate a digital fingerprint of each file to be scanned, and compare the fingerprint a fingerprints database containing fingerprints les known to contain SD. However these methods lack a sufficient degree of accuracy and have been known to generate a relatively large number of false positives and false negatives. In addition, these methods are not well equipped to handle cases where a file's content is modified in order to avoid detection (e.g. by changing the file format, cutting the tile to several smaller files, insertion of data into other files, encryption, obfuscation, etc.).

Another drawback of these latter methods is their inability to handle a large number of files, since the size of the fingerprint database is directly related to the size of files monitored (as well as the number of files, and the format of files in some cases). Therefore, these DP systems typically restrict the number and/or size of files that can be monitored to a predetermined maximum, which in some cases makes it unworkable in a large corporate environment.

Another challenge in the deployment of DP systems today is the amount of human resources that the organization needs to supply for the entire lifecycle of the DP system deployment, in order to manage the rules and policies by which the DP system operates.

Problems of identifying and tracking sensitive data have been recognized in the conventional art and various techniques have been developed to provide solutions, for example:

US2016132521 (A1) discloses a system and method for file clustering, multi-drive forensic analysis and protection of sensitive data. Multiple memory devices can store files. A module can extract characteristics from the stored files, identify similarities between the tiles based on the extracted characteristics and generate file clusters based on the identified similarities. A visual representation of the file clusters, which can be generated to show the identified similarities among the files, can be displayed by a user interface module.

The references cited above teach background information that may be applicable to the presently disclosed subject matter. Therefore the full contents of these publications are incorporated by reference herein where appropriate for appropriate teachings of additional or alternative details, features and/or technical background.

GENERAL DESCRIPTION

According to one aspect of the presently disclosed subject matter there is provided a system for identifying sensitive data (SD) from amongst data stored on one or more data repositories comprising a processor and memory block operatively coupled to the one or more data repositories and configured for: processing the data on the one or more data repositories to calculate a plurality of float feature (FF) vectors associated with the data, each FF vector associated with a file of said data and comprising a plurality of floating point numbers calculated in accordance with the binary content of said file; clustering the plurality of FF vectors into a plurality of clusters, each cluster associated with a respective subset of the data being the data in respect of which the FF vectors in the cluster were calculated; generating, for each cluster, a DNA vector representative of the cluster; comparing the DNA vectors of respective clusters to one or more FF vectors calculated for a respective one or more examples of SD; classifying one or more clusters as SD based on the result of said comparing, thereby identifying respective subsets of data as SD.

In addition to the above features, the system according to this aspect of the presently disclosed subject matter can comprise one or more of features (i) to (vii) listed below, in any desired combination or permutation which is technically possible:

(i) processing includes associating the FF vector calculated for a given file with context data associated with the given file;
(ii) the context data comprises at least one of metadata and attributes associated with the file;
(iii) the context data associated with a given file is updated upon predetermined criteria being met;
(iv) the predetermined criteria is met upon detecting a change to the given file's name, date or size;
(v) the context data associated with the FF vectors in one or more clusters is analysed using a machine learning algorithm, and, responsive to said analyzing, generating a behavior model for each subset of data associated a respective cluster of the one or more clusters;
(vi) the behavior model associated with a subset of data is used to detect outlier behavior in the subset of data; and
(vii) the one or more data repositories are repeatedly scanned, wherein in each scan, the processor and memory block processes at least a subset of files stored on the one or more data repositories, said processing including calculating FF vectors associated with the at least a subset of data files and clustering the FF vectors into corresponding clusters, thereby updating the clusters associated with the data stored on the one or more data repositories.

According to another aspect of the presently disclosed subject matter there is provided a method of identifying sensitive data (SD) from amongst data stored on one or more data repositories comprising, by a processor and memory block operatively coupled to the one or more data repositories: processing the data on the one or more data repositories to calculate a plurality of float feature (FF) vectors associated with the data, each FF vector associated with a file of said data and comprising a plurality of floating point numbers calculated in accordance with the binary content of said file; clustering the plurality of FF vectors into a plurality of clusters, each cluster associated with a respective subset of the data being the data in respect of which the FF vectors in the cluster were calculated; generating, for each cluster, a DNA vector representative of the cluster; comparing the DNA vectors of respective clusters to one or more FF vectors calculated for a respective one or more examples of SD; classifying one or more clusters as SD based on the result of said comparing, thereby identifying respective subsets of data as SD.

This aspect of the disclosed subject matter can comprise one or more of features (i) to (vii) listed above with respect to the system, mutatis mutandis, in any desired combination or permutation which is technically possible.

According to another aspect of the presently disclosed subject matter there is provided a non-transitory storage medium comprising instructions that when executed by a processor and memory block, cause the processor and memory block to perform a method of identifying sensitive data (SD) from amongst data stored on one or more data repositories, the method comprising: processing the data on the one or more data repositories to calculate a plurality of float feature (FF) vectors associated with the data, each FF vector associated with a file of said data and comprising a plurality of floating point numbers calculated in accordance with the binary content of said file; clustering the plurality of FF vectors into a plurality of clusters, each cluster associated with a respective subset of the data being the data in respect of which the FF vectors in the cluster were calculated; generating, for each cluster, a DNA vector representative of the cluster; comparing the DNA vectors of respective clusters to one or more FF vectors calculated for a respective one or more examples of SD; classifying one or more clusters as SD based on the result of said comparing, thereby identifying respective subsets of data as SD.

This aspect of the disclosed subject matter can comprise one or more of features (i) to (vii) listed above with respect to the system, mutatis mutandis, in any desired combination or permutation which is technically possible.

Among advantages of certain embodiments of the presently disclosed subject matter is capability of rapid identification of sensitive data compared to prior art methods.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "calculating", "generating", "comparing", "clustering", "classifying" or the like, refer to the actions) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the processor and memory block disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

The terms "sensitive data" and "SD" used in this patent specification should be expansively construed to cover any kind of data which is deemed by an organization in possession of the data to contain sensitive information. Examples of SD can include without limitation, e.g., proprietary data, customer data, financial data, confidential data, etc.

The term "tag" used in this patent specification should be expansively construed to cover a semantic label associated with data, and "tagging" should be construed to mean associating data with a tag.

The term "criteria" used in this patent specification should be expansively construed to include one criterion or several criterions, including any compound criterions and/or their logical combinations.

Embodiments of the presently disclosed subject matter not described with reference to any particular programming language. It will be appreciated that a variety of programming languages may be used to implement the teachings of the presently disclosed subject matter as described herein.

Figure 1:
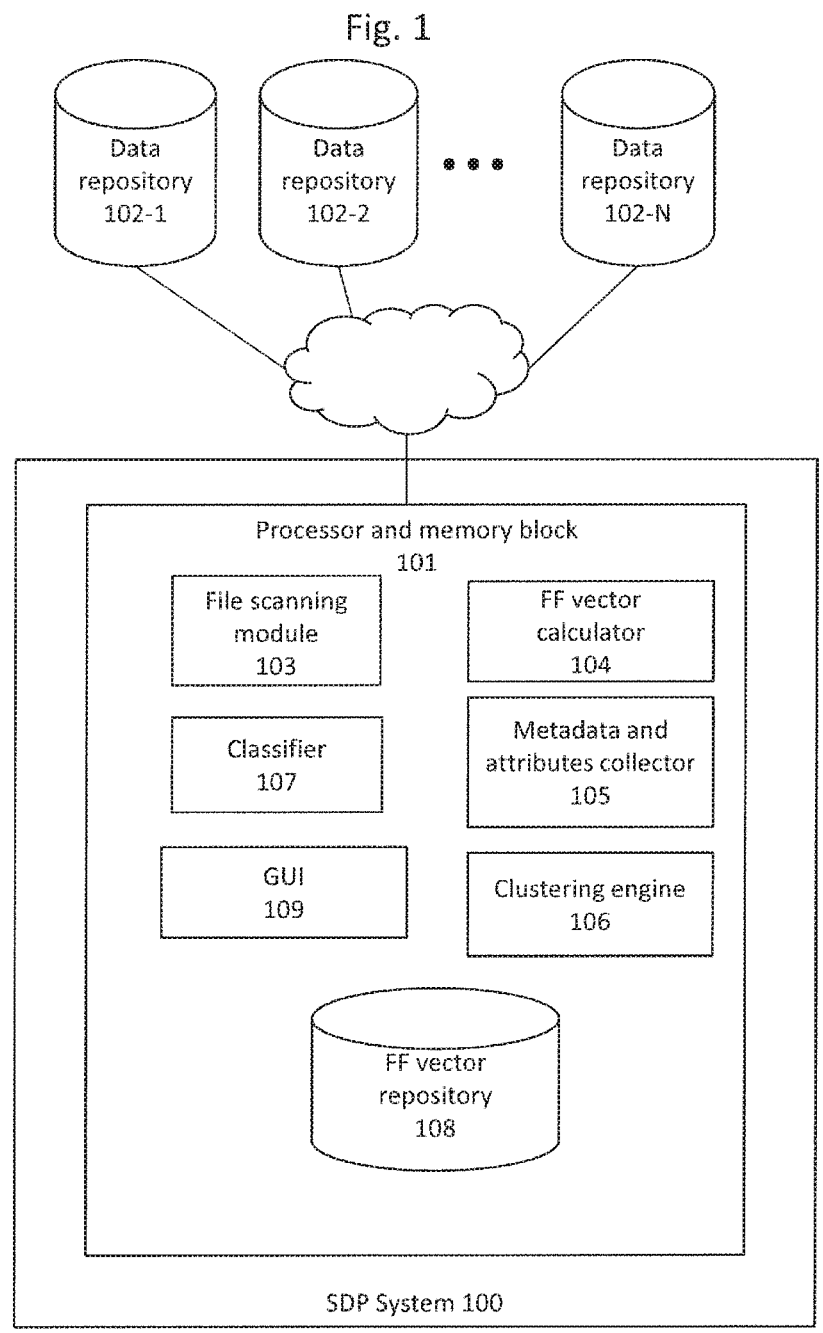
FIG. 1 illustrates a functional block diagram of a sensitive data protection (SDP) system in accordance with certain embodiments of the presently disclosed subject matter.

Bearing this in mind, attention is drawn to FIG. 1 illustrating a generalized functional diagram of a sensitive data protection (SDP) system (100). The illustrated SDP system comprises a processor and memory block (PMB) (101) operatively coupled to one or more data repositories (102-1)-(102-N) and configured to scan data repositories (102-1)-(102-N) and identify sensitive data (SD) from amongst a plurality of data stored thereon. As used herein, the term "operatively coupled" should be expansively construed to include all suitable forms of wired and/or wireless connections enabling the transfer of data between coupled components.

Data repositories (102-1)-(102-N) can include, e.g., non-volatile computer readable memory on which is stored a plurality of files. The data repositories can be distributed across multiple physical and/or virtual storage devices and/or computers. The data repositories can be distributed across multiple geographic locations and operatively coupled to PMB (101) via a data network, e.g. LAN, WAN, Internet, etc.

As will be further detailed with reference to FIG. 2, the PMB (101) can be configured to execute several functional modules in accordance with computer-readable instructions implemented on a non-transitory computer-readable storage medium. Such functional modules are referred to hereinafter as comprised in the PMB. In certain embodiments, the PMB can comprise a file scanning module (103) configured to scan a plurality of files stored on data repositories (102-1)-(102-N). The plurality of files can include all the files on data repositories (102-1)-(102-N) or some of the files. PMB can further comprise a float feature ("FF") vector calculator (104) configured to calculate a plurality of FF vectors associated with the plurality of files, as will further be detailed below with reference to FIG. 2.

In certain embodiments, PMB (101) further comprises a metadata and attributes collector (105) configured to collect metadata and/or attributes associated its with each of the plurality of files, and to associate the collected metadata and/or attributes to the file's FF vector. Metadata associated with a file stored on the data repositories includes data external to the file which describes characteristics of the file. Examples of file metadata include, without limitation, data indicative of the permission associated with the file, whether the file is read-only, hidden, etc., times of file creation and/or last modification, by whom, etc. File metadata can be collected from third party systems installed on or coupled to the data repositories, e.g. operating systems, Active Directory, etc. File attributes include data that describes characteristics of the file which is obtainable from the file itself, e.g. from the file header. Examples of file attributes can include, without limitation, e.g. the file's size, format (e.g. JPG, GIF, etc.), etc. Hereinafter, metadata and/or attributes associated with a file are collectively referred to as "context data" for the file. Further examples of context data are detailed below with reference to FIG. 2.

In certain embodiments, PMB (101) further comprises a clustering engine (106) configured to cluster the plurality of FF vectors into a plurality of clusters, each cluster associated with a subset of data stored on the data repositories, and a classifier (107) configured to classify clusters of FF vectors. PMB (101) can further comprise a data repository configured to store the clusters of FF vectors and associated context data. Data repository (108) is hereinafter also referred to as a "FF vector repository". PMB (101) can further comprise a GUI (109) configured to enable visualization of the plurality of clusters and to enable user interaction with the SDP system.

It is noted that the teachings of the presently disclosed subject matter are not bound by the SDP system described with reference to FIG. 1. Equivalent and/or modified functionality can be consolidated or divided in another manner and can be implemented in any appropriate combination of software with firmware and/or hardware and executed on a suitable device. The SDP system can be a standalone network entity, or integrated, fully or partly, with other network entities. Those skilled in the art will also readily appreciate that the data repositories can be consolidated or divided in other manner; databases can be shared with other systems or be provided by other systems, including third party equipment. In certain embodiments, one or more components of the SDP system can be physically separate from one or more other components and communicate over a data network. For example, in certain embodiments, the SDP system can be configured to operate in a cloud environment. In such a case, the file scanning module (103), FF vector calculator (104) and metadata and attributes collector (105) can physically reside on a computer operated by the organization in possession of the data repositories (102-1)-(102-N), while the classifier (107), clustering engine (106) and FE vector repository (108) can reside in the cloud on a computer operated by a third party vendor or service provider.

Figure 2:
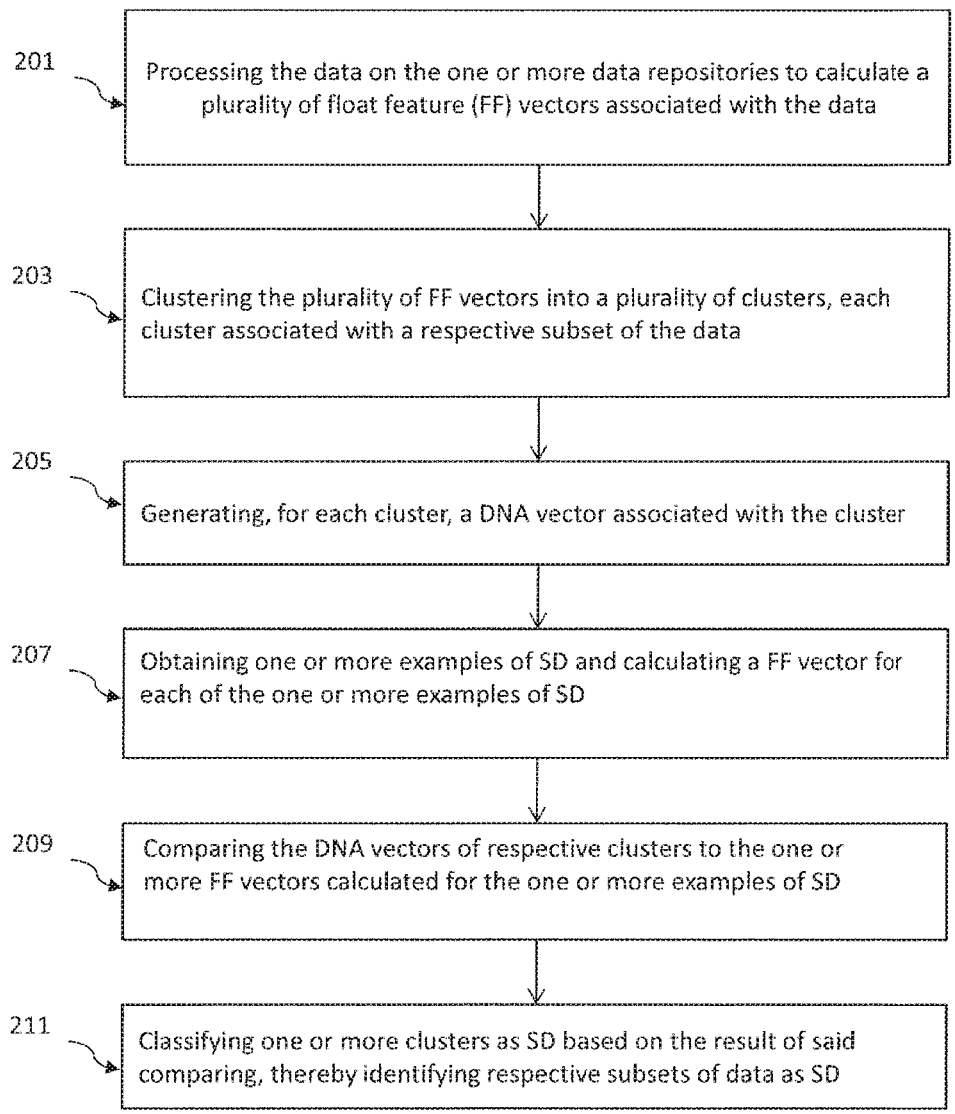
FIG. 2 illustrates a generalized flow-chart of identifying in accordance with certain embodiments of the presently disclosed subject matter.

FIG. 2 illustrates a generalized flow chart of identifying SD in accordance with certain embodiments. In certain embodiments, PMB processes (201) the data on the data repositories to calculate a plurality of FE vectors associated with the data. In certain embodiments, processing the data includes scanning one or more files, e.g. using file scanning module (103). Each file is associated with the FF vector calculate for the file. In certain embodiments, the FE vector comprises a plurality of floating point numbers calculated in accordance with the binary content of the file. In certain embodiments, each FF vector has a predetermined maximum byte length irrespective of the size of the input file. Exemplary methods of calculating a FE vector from a file are disclosed, e.g. in U.S. 62/259,749 (e.g. page 4 line 15 to page 6 line 17). The vector disclosed in U.S. 62/259,749 is calculated such that a given file will always resolve to the same vector. In addition, files having similar binary content will produce similar (though not identical) vectors, even if the respective files were created by different applications and/or are saved in different file formats (e.g. jpg, gif, pdf, etc.). In addition, the vector disclosed in U.S. 62/259,749 is a constant size, regardless of the size of the input file. This characteristic enables the efficient processing of a large amount of files, and enables efficient storage of the vectors in a data repository.

In certain embodiments, e.g. in cases where the input file is a container file that contains a plurality of files (e.g. a ZIP file), calculating a FF vector can include calculating a plurality of FF vectors associated with the plurality of files. In certain embodiments, thereafter a final FF vector for the container tile can be calculated based on the plurality of FF vectors.

In certain embodiments, processing (201) further includes collecting context data associated with the plurality of files, e.g. using metadata and attributes collector (105), and associating the FF vector calculated for a file with the context data collected for the file. Examples of context data for a file can include, e.g. file name, format, version, size, location, thumbnail, creation date/time, date/time of last update, users/computers associated with the file (e.g. authored by, created by, last updated by, etc.), file system attributes (e.g. hidden, read-only, password protected, etc.), permissions, operational unit (OU) belonging to, etc. In certain embodiments, the context data can be appended to the vector or vice versa.

Having calculated a plurality of FF vectors associated with the data, PMB (101), e.g. clustering engine (106), clusters (203) the FF vectors into clusters of FF vectors based on mathematical correlation between FF vectors, using vector correlation methods known in the art. Each cluster of vectors is associated with a subset of the data stored on the data repositories, the subset of data comprising the files associated with the FF vectors in the cluster. Hereinafter, a "cluster of data" or "data cluster" should be understood as referring to the subset of data associated with a particular cluster of FF vectors. In addition, the context data associated with the FF vectors in a particular cluster of vectors may also be referred to as being associated with the cluster of vectors and/or the subset of data associated with particular cluster.

PMB, e.g. clustering engine (106), further generates (205), for each cluster, a single FF vector which is representative of the cluster, referred to herein as the "DNA vector" of the cluster. In certain embodiments, the DNA vector of a cluster can be a mathematical average of all the vectors in the cluster and calculated using methods known in the art. A cluster's DNA vector may be stored in association with the cluster and recalculated each time a vector is added or removed from the cluster. In certain embodiments, the clustered FF vectors and associated context data are stored in FF vector repository (108).

Figure 3:
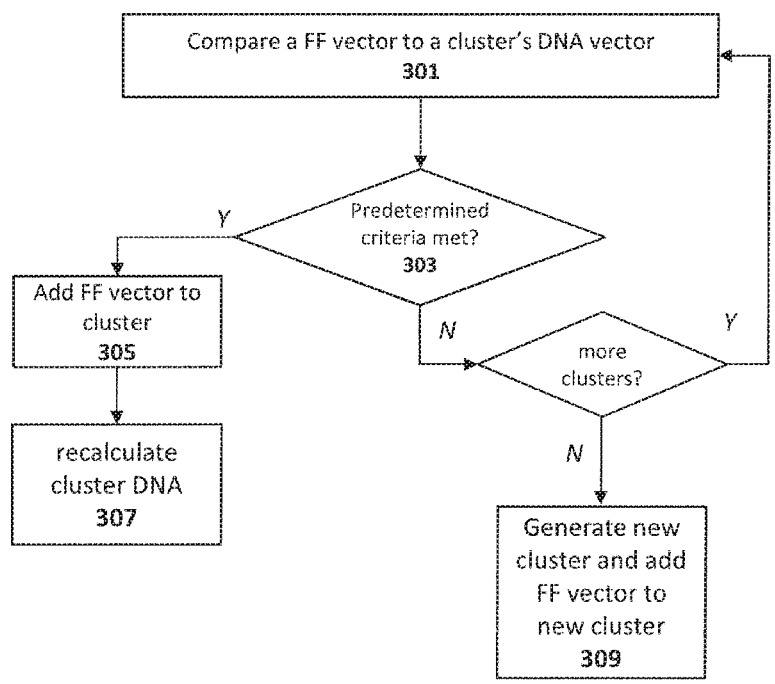
FIG. 3 illustrates a generalized flow-chart of clustering in accordance with certain embodiments of the presently disclosed subject matter.

FIG. 3 illustrates a generalized flow chart of clustering FF vectors in accordance with certain embodiments. For each vector to cluster, PMB (e.g. clustering engine (106)) compares (301) the vector to the DNA vectors of existing clusters, e.g. by evaluating the degree of correlation between the two vectors, Methods of comparing vectors of floating point numbers and determining the correlation to one another are known in the art. Exemplary methods of comparing FF vectors are disclosed in U.S. 62/259,749 (e.g. page 6 line 21 to page 7 line 6).

Upon predetermined criteria being met (303) (e.g. a sufficient degree of correlation (e.g. 80%) with a given cluster's DNA vector and no other existing cluster with a higher degree of correlation), PMB (e.g. clustering engine (106)) adds (305) the vector to the cluster and recalculates (307) the cluster's DNA vector. Alternatively, if at decision block (303) the predetermined criteria is not met in respect of any existing cluster e.g. the vector is not sufficiently correlated with any existing cluster, i.e. the highest calculated correlation with an existing cluster is less than a threshold degree of correlation), PMB (e.g. clustering engine (106)) generates (309) a new cluster and adds the vector to the new cluster, whereupon the DNA vector of the new cluster is the vector itself (until such time as a second vector is added, at which point the DNA vector is recalculated in block (307)).

Figure 4:
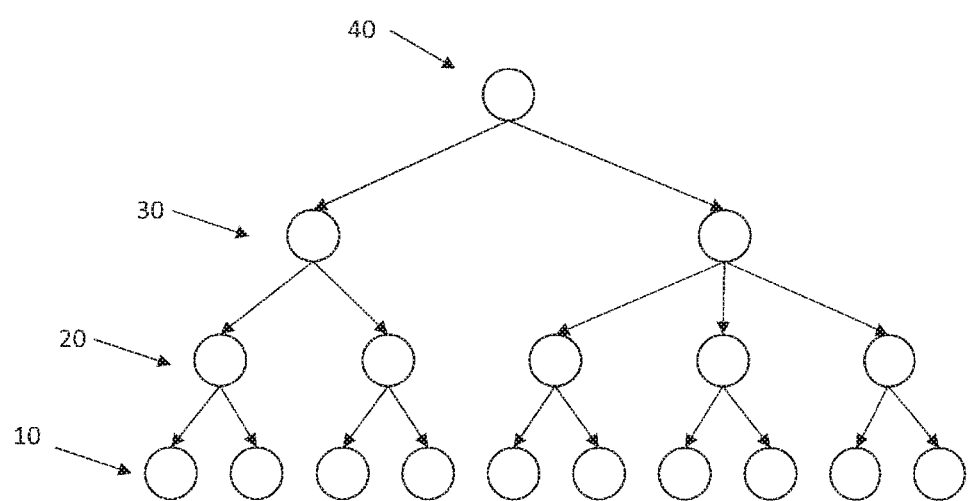
FIG. 4 illustrates hierarchal cluster correlation in accordance with certain embodiments of the presently disclosed subject matter.

In certain embodiments, the clustering methodology for clustering the FF vectors can be based on known clustering paradigms, e.g. hierarchical clustering, k-means clustering, etc. In certain embodiments, the clustering can be fully unsupervised, using a binary correlation method, e.g. by clustering vectors together when the binary correlation between respective vectors meet or exceed a predetermined threshold value (e.g. 95% correlation). In certain embodiments, the clusters can be arranged in a hierarchal clustering tree in which the tree configuration is indicative of the correlation between the various clusters in the tree, as illustrated in FIG. 4, where, by way of non-limiting example, the data in a cluster at cluster level (10) can be, e.g., 85%-100% correlated, data in cluster level (20) can be, 60%-75% correlated, data in cluster level (30) can be, e.g., 50%-60% correlated, and cluster level (40) can represent all data. As will be further detailed below, organizing the subsets of data into clusters of correlated data reduces the task of data classification to the cluster level.

Figure 5:
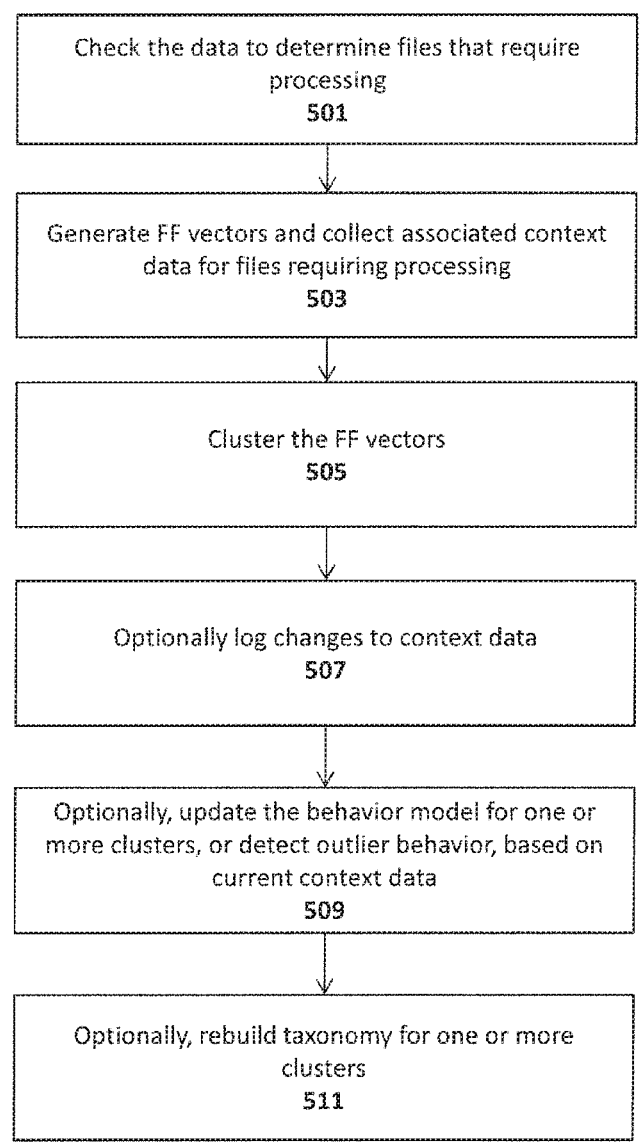
FIG. 5 illustrates a generalized flow-chart of incremental scanning in accordance with certain embodiments of the presently disclosed subject matter.

In certain embodiments, subsequent to an initial scanning and processing of all the data stored on the one or more data repositories, PMB can be configured to routinely or repeatedly (e.g. according to a predetermined schedule), or in response to one or more predetermined events (e.g. one or files having been modified), scan at least a subset of the data stored on the one or more data repositories to calculate new or updated FE vectors associated with the subset of data, and cluster the new or updated FF vectors in corresponding clusters, as will be further detailed below with reference to FIG. 5.

In certain embodiments, a visualization of e hierarchal clustering tree can be output to the user via GUI (109). This type of tree clustering can assist the user to rapidly identify correlated files on the data repositories, and the degree of correlation between them, which can greatly reduce the amount of time needed for a user to perform tagging, as will be detailed below. In certain embodiments, as will be detailed below, tags assigned to a parent cluster can automatically be propagated to child clusters, and data assigned to a given cluster can automatically be associated with the tags of the given cluster, including those tags inherited from parent clusters.

Returning to FIG. 2, having organized the data stored on the data repositories into clusters of similar data, PMB can identify clusters containing SD as follows. PMB obtains (207) one or more labelled examples of SD (e.g. one or more files containing SD supplied by a user via the GUI (109)) and calculates a FF vector for each example of SD using the same methodology as was used to calculate the FF vectors for the data stored on the data repositories. The example(s) of SD can be separate from the data stored on the data repositories, or can be a part of the data stored on the data repositories. PMB then compares (209) the DNA vectors of respective clusters of data to the FE vector calculated for the example(s) of SD. In certain embodiments, comparing two FE vectors (one of which is a DNA vector) includes calculating the mathematical correlation between the two FF vectors (e.g. 90% correlation, 80% correlation, etc.) using methods known in the art. The higher the degree of correlation between two FF vectors, the higher the degree of similarity in the binary content of the data used to produce the two vectors.

Based on the result of the comparing, PMB 101 e.g. classifier (107), classifies (211) one or more clusters as SD, thereby identifying respective subsets of data as SD. In certain embodiments, a cluster can be classified as SD upon the correlation between the cluster's DNA vector and the FF vector of the SD example meeting a predetermined threshold (e.g. 90% correlation). Conversely, if the degree of correlation is below the predetermined threshold, the cluster can be classified as not SD. In certain embodiments, one or more clusters can also be classified as non-SD based on labelled examples of non-SD (e.g. public data). If the example of SD is a part of the data on the data repositories, the FF vector for the labelled example can also be added to the cluster and stored in the FF vector repository. As used herein, a FF vector and a cluster are said to be "correlated" when the mathematical correlation between the FF vector and the cluster's DNA vector is equal to or greater than a predetermined threshold.

In certain embodiments, clusters of data identified as SD are also tagged by the system as SD. In certain embodiments, the system can further be configured to enable users to tag other clusters of data. Tagging data can be advantageous for locating, analyzing and managing large swaths of similar data stored across multiple data repositories. In certain embodiments, tags are applied on the cluster level; tagging a cluster tags all the data in the cluster.

In certain embodiments, the system can also suggest tags for a cluster, and the user can accept the systems suggestions, or some of them, or apply other tags. The tagging can be performed unsupervised, supervised, or semi-supervised. An enhanced form of tagging can also be used to assign, in the case of SD, a sensitivity level or priority and optimally keywords. Keyword tags can be used to describe the files in a cluster using descriptors which can easily be recognized by a user (e.g. "HR Docs", "Confidential", "Customer info", etc.). The system can suggest keyword tags based on e.g., the context data associated with a cluster, or the tags of similar clusters, e.g. as determined by the respective clusters location in the hierarchal cluster tree.

In certain embodiments, tag suggestions can be made by analyzing the context data associated with a cluster, using e.g., Principal Component Analysis (PCA). This statistical procedure uses an orthogonal transformation to convert a set of observations of possibly correlated variables into a set of values of linearly uncorrelated variables (the "principal components"). PCA can be applied to all or some of the context data of all or some of the vectors in a cluster to learn the most dominant characteristics of the cluster. These characteristics can be used to suggest tags. For example, if a cluster's most dominant element of context data is, e.g. operational_unit=HR, the system can suggest the tag "HR". In certain embodiments, the tags can be used by the system or another system that operates on the data repositories to trigger certain policies for the data according to the tags applied to the data.

In certain embodiments, the system can be configured to enable visualization of the clusters of data and their respective tags via the GUI (109). In certain embodiments, the visualization can include file previews or thumbnails for some or all of the data in a cluster, and can enable users to visualize the hierarchal relationship between clusters.

In certain embodiments, the system can be configured to enable outlier detection in clusters of data. For example, a user can indicate via the GUI a cluster of data the user wishes to track and detect outlier behavior. The system can track the context data associated with the cluster over a period, of time (e.g. 1-6 months) and generate a behavior model of the data by determining the context data which are usually associated with the data cluster, e.g. using a machine learning algorithm. The model can include other inferences about the data, including statistical inferences like variance of the context data associated with the data, rules-based inferences applied to the context data, etc. After having generated the behavior model for a data cluster, PMB can detect outlier behavior (which may indicate suspicious activity with respect to files in the cluster) by comparing the current (and possibly also historic) context data associated with the cluster with the model, whereby outlier behavior can be detected whenever the context data doesn't fit the model. In certain embodiments, PMB can further identify the specific one or more files that caused the breach.

It should be appreciated that generating a behavior model of a large quantity of data (which can be associated with different users and/or computers) at the cluster level reduces the task of data analysis by enabling analysis of a much smaller quantity of data clusters, each represented by its own DNA vector.

For example, the system can determine, using the model generated for a cluster, that a given cluster of data is usually modified by specific users and/or stored on a specific computers. During the next incremental scan of the data, the system can determine, using the most current context data for the cluster, if data in the cluster was modified by a user that does not usually modify data in the particular cluster, copied to a computer not normally associated with the particular cluster (e.g. a computer outside the operational unit normally associated with the data), etc. or any other finding that deviates from the behavior model for the cluster. Upon detecting outlier behavior, the system can be configured to perform one or more predetermined action or actions, e.g. generating a report, notifying an administrator (e.g. by email, sms, etc.), etc. In certain embodiments, additional data elements can be associated with a data cluster that can be incorporated into the behavior model and used to enhance the behaviour model with additional insights about the data cluster. For example, data elements can be extracted from user access logs, system logs, application logs, etc.

In certain embodiments, the system can further be configured to enable tracing of clusters of data, for example by logging changes in the context data associated with a cluster. Tracing data clusters provides a trail of historical context data associated with data clusters, e.g. for the purposes of post-breach investigation.

In certain embodiments, the system can be configured to extract textual data from the data in a cluster and generate a taxonomy associated with the cluster based on the extracted textual data. The taxonomy can also include, e.g. data indicative of the number of times each word, or certain words, appear in the data. The taxonomy can be then be used to enable fast searching of data containing certain data elements (e.g. SSN, Credit Card number, Customer ID etc.), tag suggestions, or other purposes.

FIG. 5 illustrates a generalized flow chart of an incremental scan in accordance with certain embodiments of the presently disclosed subject matter. PMB can check (501) the data stored on the data repositories, or some of them, to determine a list of files that require processing during the current incremental scan. For example, during each scan, the system can superficially scan the file system and generate a list of unique file identifiers identifying the files currently stored on the data repositories. The unique file identifier for a given file can be generated based on the file's name, date and size, thus any modification of file's name, date or size will automatically cause the system to generate a new unique file identifier for the file during the next scan. During each scan, the system can compare the list of file identifiers currently generated with the list of file identifiers that were generated for a previous scan, thus identifying the files that require processing during the current scan (namely, new files, modified tiles, etc.) In certain embodiments, other conditions can be evaluated in order to determine whether any given file should be processed (e.g. file size is different by at least N bytes, etc.).

PMB can then calculate (503) vectors and collect context data for the files requiring processing, and cluster (505) the FF vectors and associated context data, as detailed above with reference to FIG. Optionally, the system can log (507) changes to all or some of the collected context data collected during scanning. Logged context data can be used for analysing data clusters (e.g. for behavior model building), post-breach investigations, etc. Optionally, during or subsequent to an incremental scan, the system can update (509) the behaviour model for one or more data clusters and/or detect outlier behavior in a data cluster based on the most current context data. Optionally, the system can further build or rebuild (511) taxonomies associated with one or more data clusters.

The following non-limiting example may serve to illustrate further aspects of incremental scanning in accordance with certain embodiments. Suppose that after an initial scan (or any scan), file "A" is associated with FF vector $S_{A1}$ which is a member of cluster $C_{14}$ (which, suppose, for the purpose of this example is classified as non-SD, though $C_{14}$ could equally be SD without changing the nature of the process described herein). The context data associated with $S_{A1}$ specifies, inter alia, that A is located in a certain directory and has a size of, say 100 kb. At the next scheduled scan, the system checks the FF vector repository, retrieves $S_{A1}$, goes to the specified directory and finds A is now 120 kb. The system applies a set of predetermined rules or machine learning algorithm governing if further file processing is triggered for A (which can include, e.g. analysing the context data associated with $S_{A1}$ and any changes made thereto). Suppose further that based on the predetermined rules or results of machine learning the system determines that A now requires further processing. The system then further processes A by calculating a new FF vector $S_{A2}$ associated with A. The system compares $S_{A2}$ to $S_{A1}$. If $S_{A2}=S_{A1}$, $S_{A1}$'s associated context data is updated to reflect the most current context data associated with A (which may include, e.g. updating a "size" element of the context data to reflect A's new file size (120 kb). If, however, $S_{A2}\neq S_{A1}$, $S_{A2}$ is assigned to a certain cluster in the same manner as was done for $S_{A1}$. The cluster assignment might dictate that $C_{14}$ is still the most correlated cluster, or it might dictate that a different cluster (say, e.g., $C_{17}$) is more closely correlated. In either case, A is identified as either SD or non-SD based on the cluster classification of its assigned cluster. Thus, any changes that a user makes to a file that would effect its sensitivity classification (SD vs. non-SD) is automatically picked up by the system in the next incremental scan. It should be appreciated by that the classification change can be determined by the system without the system having any knowledge of the actual nature of the changes that effected the file's classification change, thus providing a robust SDP system.

Among certain other advantages of the SDP system detailed herein is the capability to be rapidly deployed in an organization with minimal user input. In contrast to prior art systems which work on identifying SD using a set of rules defined by analysts and take months to deploy, the present disclosed system can automatically detect files containing SD based on a few examples which can be provided by a user during or after installation of the system. Over the next several months, the system can learn the behavior patterns of the SD, at which point the SDP system can be fully operational.

It is noted that the teachings of the presently disclosed subject matter are not bound by the flow chart illustrated in FIG. 2, the illustrated operations can occur out of the illustrated order. For example, operations (205) and (207) shown in succession can be executed substantially concurrently or in the reverse order. It is also noted that whilst the flow chart is described with reference to elements of system (100), this is by no means binding, and the operations can be performed by elements other than those described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of identifying sensitive data (SD) from amongst data stored on one or more data repositories, the method provided by a processor and memory block operatively coupled to the one or more data repositories and comprising:

processing the data from the one or more data repositories to calculate a plurality of float feature (FF) vectors associated with the data, wherein, for each file of said data of a plurality of files of said data, a FF vector of said FF vectors is associated with said file and comprises a plurality of floating point numbers calculated in accordance with the binary content of said file, wherein, for at least some files of different size of the plurality of files, FF vectors associated with said some files have a fixed maximum byte length irrespective of a size of said some files, wherein the processing comprises, for each file of said data:

extracting bytes from a binary content of the file, wherein at least some of the bytes are representative of a graphical content present in the file, dividing the bytes into a plurality of chunks, generating, for each chunk, a pair of values characterizing data in the chunk, thereby giving rise to a plurality of pairs of values, generating a plurality of nodes in a two dimensional space, wherein each node is associated with a pair of values of the plurality of pair of values, defining location of the node in the two dimensional space, generating objects characterizing a spatial relationship between nodes of the plurality of nodes, and generating the FF vector associated with the file based on the objects;

clustering the plurality of FF vectors into a plurality of clusters, each cluster associated with a respective subset of the data being the data in respect of which the FF vectors in the cluster were calculated;

generating, for each cluster, a vector representative of the cluster;

comparing the vectors representative of respective clusters to one or more FF vectors calculated for a respective one or more examples of SD; and classifying one or more clusters as SD based on the result of said comparing, thereby identifying respective subsets of data as SD.

2. The method of claim 1, wherein said processing includes associating the FF vector calculated for a given file with context data associated with the given file, said context data comprising at least one of metadata and attributes associated with the file.

3. The method of claim 1, further comprising updating the FF vector and context data associated with a given file upon predetermined criteria being met.

4. The method of claim 3, wherein the predetermined criteria is met upon detecting a change in the given file's name, date and/or size.

5. The method of claim 2, further comprising analyzing the context data associated with the FF vectors in one or more clusters using a machine learning algorithm, and, responsive to said analyzing, generating a behavior model for each subset of data associated a respective cluster of the one or more clusters.

6. The method of claim 1, comprising at least one of (i), (ii) and (iii):
   (i) the spatial relationship comprises an angle formed between a node and two other nodes;
   (ii) the spatial relationship comprises a distance ratio between a given node and two other nodes; and
   (iii) each FF vector of each file of the plurality of files has a predetermined maximum byte length irrespective of a size of said file.

7. The method of claim 1, further comprising repeatedly scanning the one or more data repositories, wherein in each scan, the processor and memory block processes at least a subset of files stored on the one or more data repositories, said processing including calculating FF vectors associated with the at least a subset of files and clustering the vectors into corresponding clusters, thereby updating the clusters associated with the data stored on the one or more data repositories.

8. A system capable of identifying sensitive data (SD) from amongst data stored on one or more data repositories, the system comprising a processor and memory block operatively coupled to the one or more data repositories, wherein the processor and memory block is configured to:
   process the data from the one or more data repositories to calculate a plurality of float feature (FF) vectors associated with the data, wherein, for each file of said data of a plurality of files of said data, a FF vector of said FF vectors is associated with said file and comprises a plurality of floating point numbers calculated in accordance with the binary content of said file,
   wherein, for at least some files of different size of the plurality of files, FF vectors associated with said some files have a fixed maximum byte length irrespective of a size of said some files,
   wherein process the data comprises, for each file of said data:
      extracting bytes from a binary content of the file, wherein at least some of the bytes are representative of a graphical content present in the file,
      dividing the bytes into a plurality of chunks,
      generating, for each chunk, a pair of values characterizing data in the chunk, thereby giving rise to a plurality of pairs of values,
      generating a plurality of nodes in a two dimensional space, wherein each node is associated with a pair of values of the plurality of pair of values, defining location of the node in the two dimensional space,
      generating objects characterizing a spatial relationship between nodes of the plurality of nodes, and
      generating the FF vector associated with the file based on the objects, cluster the plurality of FF vectors into a plurality of clusters, each cluster associated with a respective subset of the data being the data in respect of which the FF vectors in the cluster were calculated;
   generate, for each cluster, a vector representative of the cluster;
   compare the vectors representative of respective clusters to one or more FF vectors calculated for a respective one or more examples of SD; and
   classify one or more clusters as SD based on the result of said comparing, thereby identifying respective subsets of data as SD.

9. The system of claim 8, wherein said processing includes associating the FF vector calculated for a given file with context data associated with the given file, said context data comprising at least one of metadata and attributes associated with the file.

10. The system of claim 9, wherein the processor and memory block is further configured to update the FF vector and context data associated with a given file upon predetermined criteria being met.

11. The system of claim 10, wherein the predetermined criteria is met upon detecting a change in the given file's name, date and/or size.

12. The system of claim 9, wherein the processor and memory block is further configured to analyze the context data associated with the FF vectors in one or more clusters using a machine learning algorithm, and, responsive to said analyzing, generate a behavior model for each subset of data associated a respective cluster of the one or more clusters.

13. The system of claim 12, wherein at least one of (i), (ii) and (iii) is met:
   (i) the spatial relationship comprises an angle formed between a node and two other nodes;
   (ii) the spatial relationship comprises a distance ratio between a given node and two other nodes; and
   (iii) each FF vector of each file of the plurality of files has a predetermined maximum byte length irrespective of a size of said file.

14. The system of claim 8, wherein the processor and memory block is further configured to repeatedly scan the one or more data repositories, wherein in each scan, the processor and memory block is configured to process at least a subset of data files stored on the one or more data repositories, said processing including calculating FF vectors associated with the at least a subset of files and clustering the vectors into corresponding clusters, thereby updating the clusters associated with the data stored on the one or more data repositories.

15. A non-transitory storage medium comprising instructions that when executed by a processor and memory block, cause the processor and memory block to perform a method of identifying sensitive data (SD) from amongst data stored on one or more data repositories, the method comprising:
   processing the data from the one or more data repositories to calculate a plurality of float feature (FF) vectors associated with the data, wherein, for each file of said data of a plurality of files of said data, a FF vector associated with said file and comprises a plurality of floating point numbers calculated in accordance with the binary content of said file, wherein, for at least some files of different size of the plurality of files, FF vectors associated with said some files have a fixed maximum byte length irrespective of a size of said some files, wherein the processing comprises, for each file of said data:
  extracting bytes from a binary content of the file, wherein at least some of the bytes are representative of a graphical content present in the file,
  dividing the bytes into a plurality of chunks,
  generating, for each chunk, a pair of values characterizing data in the chunk, thereby giving rise to a plurality of pairs of values,
  generating a plurality of nodes in a two dimensional space, wherein each node is associated with a pair of values of the plurality of pair of values, defining location of the node in the two dimensional space,
  generating objects characterizing a spatial relationship between nodes of the plurality of nodes, and
  generating the FF vector associated with the file based on the objects;
clustering the plurality of FF vectors into a plurality of clusters, each cluster associated with a respective subset of the data being the data in respect of which the FF vectors in the cluster were calculated;
generating, for each cluster, a vector representative of the cluster;
comparing the vectors representative of respective clusters to one or more FF vectors calculated for a respective one or more examples of SD; and
classifying one or more clusters as SD based on the result of said comparing, thereby identifying respective subsets of data as SD.

16. The storage medium of claim 15, wherein said processing includes associating the FF vector calculated for a given file with context data associated with the given file, said context data comprising at least one of metadata and attributes associated with the file.

17. The storage medium of claim 16, further comprising instructions causing the processor and memory block to update the FF vector and context data associated with a given file upon predetermined criteria being met, wherein the predetermined criteria is met upon detecting a change in the given file's name, date and/or size.

18. The storage medium of claim 16, further comprising instructions causing the processor and memory block to analyze the context data associated with the FF vectors in one or more clusters using a machine learning algorithm, and, responsive to said analyzing, generating a behavior model for each subset of data associated a respective cluster of the one or more clusters.

19. The storage medium of claim 18, wherein at least one of (i), (ii) and (iii) is met:
  (i) the spatial relationship comprises an angle formed between a node and two other nodes;
  (ii) the spatial relationship comprises a distance ratio between a given node and two other nodes; and
  (iii) each FF vector of each file of the plurality of files has a predetermined maximum byte length irrespective of a size of said file.

20. The storage medium of claim 15, further comprising instructions causing the processor and memory block to repeatedly scan the one or more data repositories, wherein in each scan, to process at least a subset of data files stored on the one or more data repositories, said processing including calculating FF vectors associated with the at least a subset of files and clustering the vectors into corresponding clusters, thereby updating the clusters associated with the data stored on the one or more data repositories.

* * * * *